Jan. 26, 1932.　　　I. W. LEVINE　　　1,842,616
INSULATING TAPE
Filed June 17, 1929
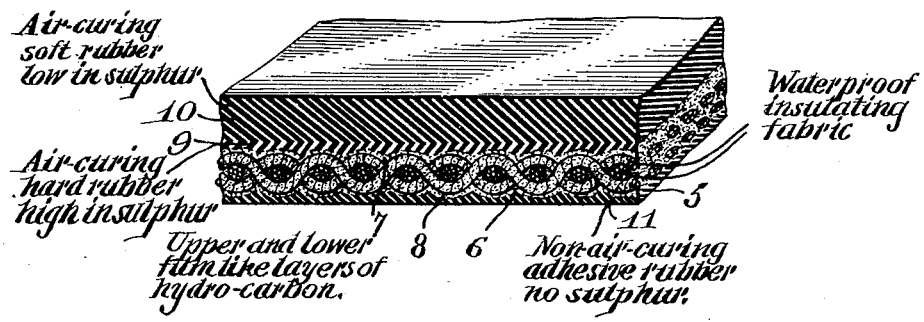
Irving W. Levine Inventor
By
Attorneys Patented Jan. 26, 1932

1,842,616

UNITED STATES PATENT OFFICE

IRVING W. LEVINE, OF MONTREAL, QUEBEC, CANADA

INSULATING TAPE

Application filed June 17, 1929. Serial No. 371,582.

The present invention relates to improvements in insulating tapes and has for its primary object to provide an insulating tape which will be waterproof and of high dielectric resistance and which will embody extremely high self-setting or vulcanizing properties so as to provide a compact and leakproof covering.

A further object of the invention is the provision of an insulating tape constructed so that the insulating and vulcanizing elements will retain their adhesive and curing properties while in rolled and inoperative position for a relatively long period of time and without deterioration.

Other objects and advantages of the invention will become apparent as the description progresses.

In order to more clearly explain the invention, reference is made to the following description of one embodiment thereof taken in connection with the accompanying drawing showing a longitudinal section of a tape drawn to a greatly enlarged scale.

Referring to the drawing more in detail, the numeral 5 indicates a foundation structure of a tape which preferably comprises a suitable fabric material. This is treated with a waterproofing material, preferably a hydrocarbon as indicated at 6. This hydrocarbon may be a mineral rubber, such as gilsonite or grahamite or the like, mixed together with about one third as much cumar and the mixture dissolved in coal tar naphtha. The fabric 5 is impregnated with the hydrocarbon so as to thoroughly fill the interstices and to leave a thin coating or film 7 and 8 on each side of the fabric as well as to thoroughly impregnate the fibres of which the fabric is composed. These films 7 and 8 are of just sufficient thickness on each side to adhere properly with the adjacent overlying layers to be presently described.

On one film 7 of hydrocarbon there is a layer or coating 9 of air curing and relatively hard electrical insulating rubber composition, high in sulphur content. The hard, mechanically strong layer 9 contributes materially to the strength of the structure of the fabric strip. The high sulphur content of this layer is prevented from acting in conjunction with the air to produce premature vulcanization because of the waterproof film which prevents ingress of air on one side thereof and because of another layer to be presently described, on the other side thereof. While the material of layer 9 may be varied to a considerable extent in its proportions, the following formula is the preferred one:

| | |
|---|---|
| Blended rubber | 16 lbs. 4 oz. |
| Reclaimed rubber | 22 lbs. |
| Pine tar flux | 4 lbs. |
| Organic accelerator for sulphur, such as captax | 0 lbs. 2 oz. |
| Stearic acid | 0 lbs. 2 oz. |
| Barytes | 20 lbs. |
| Paris whiting | 20 lbs. |
| Zinc oxide | 6 lbs. |
| Sulphur | 2 lbs. | and may contain also a small amount of anti-oxidant, such as neozone.

Superposed on and merging with the layer 9 there is another layer 10 of air-curing rubber, low in sulphur content and softer than the layer 9. This layer is adhesive in its characteristics for the purpose of clinging firmly to the conductor around which it is adapted to be wound. It is also well protected from the air during shipment and in storage, as will be hereinafter described, so that it does not become vulcanized prematurely, that is, before use. While this material may also be varied in its proportions without losing the advantages of the invention, the following formula is preferred:

| | |
|---|---|
| Blended rubber | 17 lbs. 14 oz. |
| Reclaimed rubber | 8 lbs. 8 oz. |
| Pine tar flux | 0 lbs. 14 oz. |
| Wool grease | 0 lbs. 8 oz. |
| Organic accelerator for sulphur, such as captax | 0 lbs. 2 oz. |
| Anti-oxidant, such as agerite resin | 0 lbs. 2 oz. |
| Sulphur | 0 lbs. 8 oz. |
| Stearic acid | 0 lbs. 2 oz. |
| Zinc oxide | 2 lbs. 0 oz. |
| Barytes | 7 lbs. 0 oz. |
| Whiting | 5 lbs. 0 oz. |

It will be noted that the composition of the layer 10 is such as to have relatively high dielectric resistance and vulcanization properties and that it includes ingredients that tend to resist water, oil, alkalis and the like. This layer is to be positioned directly against the electrical conductor and is to assume a vulcanized condition thereon as later explained.

On the opposite side of the foundation structure or strip 5 from the layers 9 and 10 there is applied a layer 11 of a relatively soft normally non-air-curing compound acting as an adhesive. This soft adhesive layer is the outer side of the tape as it is wound about a conductor or electrical joint and preferably has the following composition:

| | | |
|---|---|---|
| Blended rubber | 25 lbs. | 4 oz. |
| Mineral rubber | 0 lbs. | 1 oz. |
| Reclaimed rubber | 6 lbs. | 0 oz. |
| Wool grease | 0 lbs. | 12 oz. |
| Pine tar flux | 3 lbs. | 2 oz. |
| Anti-oxidant, such as agerite resin | 0 lbs. | 4 oz. |
| Zinc oxide | 3 lbs. | 0 oz. |
| Barytes | 12 lbs. | 0 oz. |
| Lithophone | 6 lbs. | 0 oz. |

The tape is to be usually packed for distribution in the form of rolls of predetermined length, a strip of suitable fabric, preferably what is known in the trade as "Holland", being interposed in the roll as a temporary protection and to prevent adhesion between the soft layer 10 and the opposite soft adhesive layer 11 where they lie facing each other in successive convolutions of the roll. This "Holland" is, of course, removed before applying the tape to a conductor, being merely employed for convenience in shipment and transportation and having nothing to do with the actual winding of the material on the wire. It will be noted that the composition and arrangement of the constituent elements of a roll are such as to result in an exceptionally long shelf life without deterioration and premature vulcanization taking place. The layer 9 having a high sulphur content has the waterproof film and fabric strip on one side thereof which effectually prevents the air from reaching it and without air vulcanization does not take place, while on the other side, the soft rubber layer 10 is in close contact with the layer 9 and prevents air from reaching it. The layer 10 is also protected from the air when it lies wound within the convolutions of the roll. The layer 11 is not only protected from the air but is also without sulphur content, unless in contact with the layer 10 on the conductor, as will be hereinafter explained, so that there is no tendency for the layer 11 to vulcanize as long as it remains in the roll. The waterproof films and fabric strip 5 separate the sulphur bearing layer 9 from the soft adhesive layer 11 and effectually prevent the migration of sulphur thereto. The "Holland" which separates the layer 10 from the layer 11 when wound on the roll prevents the migration of sulphur therebetween.

In use, the tape is wrapped about the electrical joint or other connection in spiral form, with the soft adhesive layer 10 placed directly against and in contact with the connection to be covered. By this arrangement, a portion of each successive turn of the layer 10 overlies a corresponding portion of the soft highly adhesive layer 11 to provide the initial adhesive connection. The inner vulcanizing layer will subsequently assume an air-cured or vulcanized state to provide an inner continuous vulcanized surface directly in contact with the covered connection. It will be noted that the layer 10 farthest from the oil film 7 has considerably less sulphur content than the layer 9 which is nearest the oil film 7. The initial difference in sulphur content is not preserved, however, as the sulphur diffuses or migrates from the layer 9 into and through the layer 10 thereby providing the sulphur for more rapid and complete vulcanization of the layer 10. By initially incorporating into the layer 10 only a fraction of the sulphur that it will eventually contain because of the migration or diffusion of the sulphur from the layer 9, the outer layer 10 preserves its flexibility for a considerable length of time between manufacture and use, while the fabric foundation structure and films and also the relatively harder and stronger layer 9 lie within the tape as a whole.

The adhesive layer 11 which in itself is non-air-curing, having no sulphur content, will, wherever it is overlaid by another convolution, receive sulphur by diffusion from the layer 10 which it touches and will eventually also become vulcanized and there will be formed a cohesive compact insulation around the joint wherein the adjacent layers are thoroughly vulcanized together. The sulphur diffuses into the side of layer 11 which lies in contact with the layer 10, the other side of the layer 11 being effectually screened from sulphur migration by the intervening waterproof fabric strip.

The compact homogeneous vulcanized mass of rubber in which the waterproof strip 5 and the hydrocarbon films are so thoroughly embedded as to be essentially a part thereof has been found under tests to give dielectric resistance values many times greater than are usually reached with ordinary tapes. These higher insulating values are particularly noticeable in connection with waterproof tests, the hydrocarbon mineral rubber raising the insulating dielectric resistance very greatly under such conditions, and maintaining an insulating strength of several thousand volts for a total thickness of the tape of about three one-hundredths of an inch.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. An insulating tape comprising a foundation strip impregnated with a hydrocarbon mineral rubber, an air-curing layer of insulating rubber composition with a high sulphur content on one side thereof, and an adhesive layer on the other side thereof of normally non-air-curing rubber composition adapted to receive sulphur from the first named layer when positioned adjacent thereto and in contact therewith on a conductor, the first named layer having a greater sulphur content in that portion near the foundation strip and a lesser sulphur content in that portion away from the foundation strip.

2. A combination tape comprising an impregnated fabric which is waterproof and of high dielectric strength, a film of hydrocarbon material on each side of said fabric, a relatively soft adhesive rubber composition overlying one of said films, and a composite sulphur bearing rubber composition overlying the other of said films, said last named composition comprising a relatively hard layer adjacent the film and a relatively soft layer on the surface of said hard layer.

3. A combination tape comprising an impregnated fabric which is waterproof and of high dielectric strength, a film of hydrocarbon material on each side of said fabric, a relatively soft adhesive rubber composition overlying one of said films, and a composite sulphur bearing rubber composition overlying the other of said films, said last named composition comprising a relatively hard layer adjacent the film and a relatively soft layer on the surface of said hard layer, the hard rubber layer having a higher sulphur content than the soft layer lying thereon and the soft adhesive composition being adapted to be air-cured by impregnation of sulphur from the composite composition in the finally wound position of the tape.

4. An insulating tape comprising a fabric material impregnated with and covered on each side by waterproofing material, the said waterproofing material being formed to resist the diffusion of air curing ingredients therethrough, a layer of air curing insulating rubber composition high in sulphur content applied upon one side of the waterproofing material covering the fabric, a second layer of air curing composition, relatively soft and low in sulphur content applied over the first mentioned air curing layer, and a layer of adhesive non-air curing compound on the opposite side of the fabric applied directly upon the waterproofing material covering the fabric.

In witness whereof I have hereunto set my hand.

IRVING W. LEVINE.